United States Patent
Rothschild et al.

[11] Patent Number: 5,966,694
[45] Date of Patent: Oct. 12, 1999

[54] METHOD AND APPARATUS FOR CYCLE TIME COSTING

[75] Inventors: Michael L. Rothschild, Greenbrae, Calif.; Mark H. Shwert, Andover, Mass.

[73] Assignee: Maxager Technology, Inc., San Rafael, Calif.

[21] Appl. No.: 08/880,320

[22] Filed: Jun. 23, 1997

Related U.S. Application Data

[63] Continuation of application No. 08/431,679, May 2, 1995, abandoned.

[51] Int. Cl.$^6$ ..................................................... G06F 17/30
[52] U.S. Cl. ................................................................ 705/7
[58] Field of Search .... 705/7, 8, 9; 364/468.05–468.09

[56] References Cited

U.S. PATENT DOCUMENTS 5,189,624  2/1993  Barlow et al. ..................... 364/474.11

OTHER PUBLICATIONS

Lawrence S. Gould, "Monitoring Systems End Profit Give-Aways", Plastics World, pp. 52–55, Mar. 1995.

*Primary Examiner*—Frantzy Poinvil
*Attorney, Agent, or Firm*—Fliesler, Dubb, Meyer & Lovejoy LLP

[57] ABSTRACT

A cycle time costing method and apparatus is provided to obtain cost, efficiency, bottleneck and value creation information in a manufacturing facility. The manufacturing facility includes a plurality of production lines with each production line including a plurality of process steps. A work cell which includes a plurality of workers is responsible for each process step. Each work cell has an associated local processing apparatus for inputting process step quantity and time information. The local processing apparatus is coupled to a central processing apparatus via local area network. The central processing apparatus then calculates cycle time costing information regarding each work cell in the manufacturing facility. The cycle time costing information may include, among other information, gross cycle time, net cycle time, bottleneck costs and scrap information for each process step and/or a product manufactured by a plurality of process steps. The cycle time cost information is then transferred to a printer or projection display nearby a work cell.

37 Claims, 19 Drawing Sheets

WORKCELL THRUPUT REPORT: 3/19/95 THROUGH 3/25/95

| CUSTOMER: | ALL | DIVISION: | | TEAM: | YELLOW | |
|---|---|---|---|---|---|---|
| LOCATION: | ALL | PROD TYPE: | ALL | WORK CELL: | CUT/TAPE | AVG GROSS CYCLE TIME: |
| PROCESS: | ALL | STOCK NO.: | ALL | SHIFT: | 3 | 1:3:50 |

| GCT/REEL | 1.160 | TOTAL REELS: | 17 | SCRAP %: | 12.3% | AVG NET CYCLE TIME: |
|---|---|---|---|---|---|---|
| NCT/REEL | 0.226 | THRUPUT (k): | 160 | YIELD %: | 87.7% | 0:5:25 |
| | | SCRAP (k): | 23 | FLOW RATE(P/HR) | 1,740 | |

| STOCK NUMBER | NUMBER OF REELS | THRUPUT QTY (k) | YIELD % | GROSS CYCLE (DD:HH:MM) | NET CYCLE (DD:HH:MM) | NET FLOW RATE (PARTS/HR) |
|---|---|---|---|---|---|---|
| A58563 | 2 | 42.54 | 87% | 0:11:22 | 0:11:11 | 1,900 |
| B59209 | 3 | 29.81 | 90% | 2:11:24 | 0:04:18 | 2,306 |
| A58880 | 4 | 27.73 | 97% | 0:04:38 | 0:03:19 | 2,087 |
| A58645 | 2 | 25.25 | 77% | 0:10:16 | 0:04:04 | 3,093 |
| 50802 | 2 | 13.25 | 99% | 2:15:13 | 0:02:56 | 2,252 |
| A58601 | 2 | 13.01 | 94% | 0:14:22 | 0:02:37 | 2,483 |
| A58707 | 1 | 4.54 | 75% | 1:22:51 | 0:06:42 | 677 |
| A58503 | 1 | 4.30 | 68% | 1:07:19 | 0:17:36 | 244 |

FIG. 11

DAILY REEL PRODUCTION SUMMARY FOR THE PERIOD: 3/26/95 TO 4/1/95

| CUSTOMER | ALL | DIVISION | ADVANCED PRODUCTS GROUP | PRODUCT GROUP | ALL | WORKORDER | ALL |
|---|---|---|---|---|---|---|---|
| LOCATION | ALL | TEAM | ALL | PRODUCT TYPE | ALL | REEL | ALL |
| COMPANY | | WORKCENTER | ALL | STOCK NUMBER | ALL | | |

| CYCLE TIME SUMMARY: | | AVG CYCLE TIME PER REEL: | | UNIT SUMMARY: | | CT COST SUMMARY: | |
|---|---|---|---|---|---|---|---|
| GROSS CYCLE TIME: | 2323:16:48 | GROSS CT/REEL: | 17.34 | GROSS UNITS(K): | 1,821 | NET CT COST: | 0 |
| NET CYCLE TIME | 576:22:20 | NET CT/REEL: | 4.31 | NET THRUPUT(K): | 1,243 | NET RM COST: | 45,141 |
| SAVINGS OPP'Y: | 1746:18:28 | REELS PROCESSED: | 134 | SCRAP UNITS(K): | 579 | SCRAP COST: | 18,113 |
| FLOW EFFICIENCY: | 25% | | | OVERALL YIELD% | 68% | TOTAL COST: | 63,254 |

| DATE | NUMBER OF REELS | NET UNIT VOLUME K | GROSS CYCLE TIME HRS/K | NET CYCLE TIME HRS/K | GROSS FLOW RATE PARTS/HR | NET FLOW RATE PARTS/HR | YIELD% | FLOW EFFICIENCY | NET CT COST $ | NET RM COST $ | NET SCRAP COST $ | TOTAL COST $ |
|---|---|---|---|---|---|---|---|---|---|---|---|---|
| 3/26 | 0 | | | | | | | | | | | |
| 3/27 | 10 | 74 | 46.62 | 16.92 | 21 | 59 | 64% | 36% | 0 | 3,388 | 1,782 | 5,170 |
| 3/28 | 13 | 132 | 43.61 | 9.19 | 23 | 109 | 81% | 21% | 0 | 5,086 | 1,353 | 6,440 |
| 3/29 | 31 | 331 | 44.93 | 10.91 | 22 | 92 | 66% | 24% | 0 | 6,328 | 2,207 | 8,535 |
| 3/30 | 31 | 170 | 92.76 | 30.23 | 11 | 33 | 49% | 33% | 0 | 7,497 | 5,155 | 12,652 |
| 3/31 | 15 | 223 | 10.48 | 1.84 | 95 | 544 | 73% | 18% | 0 | 7,483 | 2,718 | 10,201 |
| 4/1 | 34 | 312 | 43.40 | 7.07 | 23 | 142 | 79% | 16% | 0 | 15,358 | 4,898 | 20,257 |

FIG. 13

CTC WO SUMMARY REPORT 04/14/95 09:49 PAGE 1

| ITEM | WO | LINE | OPER | FUNCTION | EMP ID | EMP NAME | TY | QTY | DATE | TIME | WC | SCRAP | R1 | R2 | R3 | R4 |
|---|---|---|---|---|---|---|---|---|---|---|---|---|---|---|---|---|
| A58447 | 6211 | 0001 | 10 | DRY ETCH | M2264 | JOHN DOE | IN | 5.61 | 03/29/95 | 11:54:19 | CELLT101 | | | | | |
| A58447 | 6211 | 0001 | 10 | DRY ETCH | M2264 | JOHN DOE | RS | 6.17 | 03/29/95 | 11:55:00 | CELLT101 | | | | | |
| A58447 | 6211 | 0001 | 10 | DRY ETCH | M2264 | JOHN DOE | CM | 6.17 | 03/29/95 | 14:03:51 | CELLT101 | | | | | |
| A58447 | 6211 | 0001 | 20 | WET ETCH | 58016 | JEFF BROWN | IN | 6.17 | 03/29/95 | 16:03:34 | CELLT201 | | | | | |
| A58447 | 6211 | 0001 | 20 | WET ETCH | AJA | | IC | 6166.83 | 03/29/95 | 16:37:29 | CELLT201 | | | | | |
| A58447 | 6211 | 0001 | 20 | WET ETCH | M3984 | JANE SMITH | RS | 6.01 | 03/30/95 | 22:47:31 | CELLT201 | .15 | 49 | | | |
| A58447 | 6211 | 0001 | 20 | WET ETCH | M3984 | JANE SMITH | CM | 6.01 | 03/30/95 | 05:25:02 | CELLT201 | .15 | 49 | | | |
| A58447 | 6211 | 0001 | 30 | PLATE | 21902 | JIM SMITH | IN | 6.01 | 03/31/95 | 01:23:28 | CELLO301 | | | | | |
| A58447 | 6211 | 0001 | 30 | PLATE | M3570 | GREG JONES | RS | 5.60 | 03/31/95 | 01:23:42 | CELLO301 | | | | | |
| A58447 | 6211 | 0001 | 30 | PLATE | M3570 | GREG JONES | CM | 5.60 | 03/31/95 | 03:38:26 | CELLO301 | | | | | |
| A58447 | 6211 | 0001 | 40 | TAPE | 61043 | MARY PARKER | IN | 5.60 | 04/07/95 | 13:33:52 | CELLO401 | .20 | 30 | 85 | | |
| A58447 | 6211 | 0001 | 40 | TAPE | 5574 | TONY ROCCA | RS | 5.00 | 04/07/95 | 13:34:09 | CELLO401 | .20 | 30 | 85 | | |
| A58447 | 6211 | 0001 | 40 | TAPE | 5574 | TONY ROCCA | CM | 5.00 | 04/07/95 | 16:24:20 | CELLO401 | | | | | |
| A58447 | 6211 | 0001 | 50 | CUT | 5574 | TONY ROCCA | IN | 5.00 | 04/07/95 | 16:25:52 | CELLO401 | | | | | |
| A58447 | 6211 | 0001 | 50 | CUT | 5574 | TONY ROCCA | RS | 5.00 | 04/07/95 | 16:26:06 | CELLO401 | | | | | |
| A58447 | 6211 | 0001 | 50 | CUT | 5574 | TONY ROCCA | CM | 5.00 | 04/07/95 | 16:26:24 | CELLO401 | | | | | |
| A58447 | 6211 | 0001 | 60 | SORT/PAK | 5421 | LILY DOE | IN | 5.00 | 04/07/95 | 19:56:39 | CELLO701 | | | | | |
| A58447 | 6211 | 0001 | 60 | SORT/PAK | 5421 | LILY DOE | RS | | 04/11/95 | 19:59:02 | CELLO701 | | | | | |
| A58447 | 6211 | 0001 | 8400 | | | | WC | 4.24 | | | STORES | | | | | |

FIG. 14

STOCKNUMBER BOTTLENECK REPORT:

| PART: | A59356 | REELS: | 36 | FOR THE PERIOD: | 2/10/95 | THROUGH | 2/15/95 |
|---|---|---|---|---|---|---|---|
| DESCRIPTION: #REFI | | NET PARTS (K): | 313 | TOTAL NET CYCLE TIME (DAYS:HOURS:MIN): | | | 83:01:16 |
| | | | | AVG NET FLOW RATE (PARTS/HOUR): | | | 157 |

STOCKNUMBER BOTTLENECK ANALYSIS:

| | | | | BOTTLENECK: | SORT/PACK | |
|---|---|---|---|---|---|---|
| | | FLOW RATE (PARTS/HR): | | BOTTLENECK: | 33 | |
| | | NET YIELD %: | | | 69.6% | |

| TEAM | WORKCELL | NUMBER OF REELS | NET CYCLE TIME (DAYS) | NET FLOW RATE (PARTS/HR) | NET PARTS (K) | AVERAGE YIELD % | AVERAGE NET FLOW RATE (PARTS/HOUR) |
|---|---|---|---|---|---|---|---|
| BY PROCESS STEP: | | | | | | | |
| | ETCH-DRY | 0 | 0.0 | 0 | | | |
| | ETCH-WET | 0 | 0.0 | 0 | | | |
| | STAMPING | 0 | 0.0 | 0 | | | |
| | PLATING | 22 | 0.9 | 183 | | 94.0% | 8,527 |
| | CUT/TAPE | 7 | 0.9 | 54 | | 94.8% | 2,490 |
| | SORT/PACK | 6 | 66.6 | 52 | | 78.1% | 33 |
| BY WORKCELL: | | 36 | 83.1 | 313 | | 94.5% | 157 |
| ORANGE | | 12 | 5.0 | 98 | 6 | 94.1% | 823 |
| | STAMPING | 0 | 0.0 | 0 | | | |
| | PLATING | 1 | 0.0 | 6 | | | |
| | CUT/TAPE | 7 | 0.9 | 54 | | 94.8% | 2,490 |
| | SORT/PACK | 4 | 4.1 | 38 | | 88.7% | 389 |
| YELLOW | | 23 | 63.4 | 192 | | 89.2% | 126 |
| | STAMPING | 0 | 0.0 | 0 | | | |
| | PLATING | 21 | 0.9 | 177 | | 93.0% | 8,248 |
| | CUT/TAPE | 0 | 0.0 | 0 | | | |
| | SORT/PACK | 2 | 62.5 | 14 | | 59.4% | 10 |
| TEAL | | 1 | 14.7 | 23 | | 189.5% | 67 |
| | ETCH-DRY | 0 | 0.0 | 0 | | | |
| | ETCH-WET | 0 | 0.0 | 0 | | | |
| | PLATING | 0 | 0.0 | 0 | | | |
| | CUT/TAPE | 0 | 0.0 | 0 | | | |
| | SORT/PACK | 0 | 0.0 | 0 | | | |

STOCKNUMBER COST ANALYSIS:

| | |
|---|---|
| BOTTLENECK FLOW RATE (K/MIN): | 0.001 |
| APG CYCLE TIME CHARGE ($/MIN): | |
| BREAKEVEN COST | 5.06 |
| RONA @ 40% | 0.87 |
| CYCLE TIME COST ($/K): | 5.93 |
| RAW MATERIAL COST ($/K): | 10,914.41 |
| YIELD %: | 61.11 |
| SCRAP COST ($/K): | 69.6% |
| | 26.69 |
| TOTAL FACTORY COST ($/K): | 11,002.20 |
| AVERAGE SELLING PRICE ($/K): | |
| PROFIT (LOSS) ($/K): | (11,002.20) |

| WORKCELL VALUE CREATION: | 3/19/95 | THROUGH | 3/25/95 | | | |
|---|---|---|---|---|---|---|
| CUSTOMER: | ALL | DIVISION: | | TEAM: | YELLOW | |
| LOCATION: | ALL | PROD TYPE: | ALL | WORK CELL: | CUT/TAPE | |
| PROCESS: | ALL | STOCK NO.: | ALL | SHIFT: | 3 | |
| | | | | | | |
| TOTAL REELS: | 17 | AVG SCRAP % | 12.3% | GROSS CT | 19:17:26 | REVENUE VALUE: 16,043 |
| THRUPUT (K): | 160 | AVG YIELD % | 87.7% | NET CT | 3:20:11 | 7,052 |
| SCRAP (K): | 23 | FLOW RT (P/HR): | 6,600 | FLOW EFF'Y | 19.5% | SCRAP OPP'Y COST: 949 |

| STOCK NUMBER | THRUPUT QTY (k) | FACTORY REVENUE | RM COST | CYCLE TIME COST | SCRAP COST | LABOR COST | VALUE CREATED |
|---|---|---|---|---|---|---|---|
| 50802 | 13.25 | 1,325 | 99.0% | 4.7% | 1 | 100.0% | 61 |
| A58503 | 4.30 | 430 | 67.7% | 56.2% | 78 | 100.0% | 164 |
| A58563 | 42.54 | 4,254 | 87.3% | 98.5% | 530 | 100.0% | 3,659 |
| A58601 | 13.01 | 1,301 | 94.3% | 18.2% | 13 | 100.0% | 224 |
| A58645 | 25.25 | 2,525 | 76.7% | 39.7% | 233 | 100.0% | 770 |
| A58707 | 4.54 | 454 | 74.9% | 14.3% | 16 | 100.0% | 49 |
| A58880 | 27.73 | 2,773 | 97.2% | 71.7% | 55 | 100.0% | 1,932 |
| B59209 | 29.81 | 2,981 | 89.7% | 7.3% | 22 | 100.0% | 194 |

METHOD AND APPARATUS FOR CYCLE TIME COSTING

This application is a continuation of Ser. No. 08/431,679, filed May 2, 1995, now abandoned.

BACKGROUND OF THE INVENTION

1. Field of the Invention

The present invention relates to obtaining cost information. In particular, the present invention relates to a method and apparatus for determining the cost of products in a manufacturing facility, thereby improving efficiency and profitability in manufacturing products.

2. Description of the Related Art

Manufacturing facilities are extremely complex and must accommodate: 1) a number of process steps; 2) a wide variety of products; and 3) a wide range of units per customer order. For example, a manufacturing facility which produces lead frames for semiconductor devices may have to produce 750 distinct types of lead frames. A lead frame may have from 8 leads to 208 leads. Some lead frame types may require relatively simple manufacturing steps, where other lead frames may require many complex process steps. Order quantities from customers can range from 10,000 units per order up to 1,000,000 units per order.

Based on a customer order, workorders are generated listing what type of, and how many, products must be manufactured to fill a customer order. A workorder will include a lot number identifying a quantity of material which will be processed into manufactured products. In the lead frame manufacture example, a lot is a reel of metal which will be processed to produce multiple lead frames. Generally, a shop packet or paper printout listing the workorder and other information accompanies lots or reels during the manufacturing process.

A manufacturing facility generally includes a large number of production lines producing an array of distinct products. Each production line may include a number of process steps in manufacturing the final product. In the lead frame manufacturer example, process steps may include a dry etching step and a plating step, among a number of other process steps, in producing the lead frame product supplied to a customer. In each process step, there may be a time period wherein the units are being processed by a machine or undergoing a production run. When the units are not undergoing a production run, the units may be waiting or queued for another process step.

Each process step may have groups of workers organized in teams to complete a particular process step. There may also be multiple shifts or different time periods during a given day where a different group of workers are assigned to a production line for a particular process step.

In most modern manufacturing facilities, a type of system known as Manufacturing Resource Planning ("MRP") is used to keep track of work orders flowing through the production process. For example, an MRP system known as CHESS, supplied by McDonnell Douglas Information Systems, located at Long Beach, Calif., attempts to optimize the manufacturing process by intertwining various software modules. Typically, one module of an MRP system is the costing module.

From costing studies using a typical number of units produced under typical factory conditions, a "standard cost" is determined for each product. This standard cost comprises two component costs: 1) raw material costs per unit; and 2) overhead allocation cost per unit. The standard cost is input into a costing module database accessible by the MRP system. As products flow through the production process, these standard costs are attributable to specific customer orders to determine whether the total cost of these units to the customer was less than, or greater than, the price charged to the customer.

However, these MRP software packages do not accurately provide real-time detail information regarding the manufacturing process. In particular, these MRP software packages do not provide detailed information regarding specific process steps or obtain data on the actual production experience of each and every work order as it flows through the factory. MRP systems do not obtain cost information in real-time or as products are being manufactured at specific process steps. MRP systems rely upon standard costs in a database which may not accurately reflect the current number of units produced or current factory conditions. In order to obtain accurate cost information in MRP systems, additional cost studies requiring substantial amounts of clerical and administration costs is required. Because adequate information from specific process steps is not obtained, accurate information identifying how the manufacture of a specific product can be improved by improving particular process steps and their interaction is not possible. For example, during a particular process step or cycle, it is not known what amount of time is used in setting up the process or machine, rather than actually running the process. Further, there is not adequate information as to how much and how long inventory has been waiting before undergoing a production run in a particular process step. Likewise, during the process step itself, there may not be accurate information as to the production run machine speed and whether process innovations or improved machines may enable a more efficiently manufactured final product. Further, there is no adequate information in regard to the inventory of completed process step units awaiting a next process step. There is no adequate information regarding when a process should be completed in order to coincide with a next process step processing capability.

Similarly, adequate information regarding the efficiency or yield of a particular process step is not available. For example, adequate information regarding the amount of scrap or unusable completed process step units which should be allocated to a particular process step is not taken into account. Scrap units created in one process step may not be identified until a few process steps later. Thus, certain process steps may appear to be efficient while their scrap units are not accurately being identified.

Further, typical costing methods called standard costing or "activity-based costing" only determine the amount of time a typical unit of product spends at each manufacturing step and multiplies this time by a time charge for equipment and labor associated with each manufacturing step. The total cost to manufacture the product is then determined by adding together the costs of each manufacturing step. However, these methods do not determine which process step in the series of production steps is the bottleneck for a specific product type and work order quantity.

Also, value creation information in a process step must be identified. A process step should be able to compare with previous production runs how efficient units are processed with respect to yield, flow efficiency and labor efficiency.

Therefore, it is desirable to provide a method and apparatus which provides information concerning cost, efficiency, bottlenecks, scrap and value creation in particular process steps in manufacturing a product. Further, it is desirable to obtain not only cost, efficiency, bottleneck, scrap and value creation regarding a specific process step in manufacturing a product, but to obtain this information in all products in a manufacturing facility with a wide range of customer order quantities. This information should be obtained continuously in real-time using actual production information without requiring a priori costing studies.

SUMMARY OF THE INVENTION

Other aspects and advantages of the present invention can be seen upon review of the figures, the detailed description, and the claims which follow.

According to the present invention, a method is provided which allows for obtaining cost information in a manufacturing facility using time and quantity data from a work cell. The time and quantity data is stored in memory. Cost information regarding the work cell is calculated in response to the time and quantity information. The cost information is then output to a display.

The novel method automatically collects the time and quantity data in the current production cycle of all units in the manufacturing facility. The actual cost of each work order and each product unit is calculated in real-setting of standard costs. Further, the invention eliminates a substantial amount of clerical and administrative costs, while generating real-time accurate and continuous cost information.

In another aspect of the invention, the work cell completes a manufacturing process step.

In another aspect of the invention, the time and quantity data includes unit acceptance and set-up time, unit acceptance quantity, manufacturing process step begin run time, complete run time and complete quantity.

In another aspect of the invention, the cost information includes gross cycle time, net cycle time and scrap quantity.

In another aspect of the invention, an apparatus improves a manufacturing facility which includes a work cell for completing a process step. Means for obtaining unit quantity and time data from the work cell is coupled to means for calculating cycle time cost data. Means for outputting the work cell cycle time cost data is then coupled to the means for calculating. The unit quantity and time data includes unit acceptance quantity, unit acceptance and set-up time, begin run time, unit complete quantity and unit complete time.

In another aspect of the invention, the means for obtaining includes a bar code scanner coupled to a computer. The means for calculating includes a computer coupled to a network. The means for outputting includes a printer, projection screen or display screen.

In another aspect of the invention, a system improves factory profitability. The factory includes a plurality of production lines and each production line includes a plurality of work cells. Means for obtaining unit information from a work cell in a production line is coupled to local processing means for storing unit information. Central processing means for calculating cycle time costing data is coupled to the local processing means. Means for outputting the cycle time costing data is then coupled to the central processing means. The work cell cycle time costing data includes, among other information, gross cycle time, net cycle time, throughput, yield and bottleneck information.

In another aspect of the invention, the means for obtaining includes a keyboard coupled to a computer. The local processing means includes a computer coupled via network to a central processing unit, including a server coupled to a computer. The central processing means includes a work cell activity module, a work cell value creation module, a manager report module, a bottleneck costing module and a scrap chargeback module.

BRIEF DESCRIPTION OF THE DRAWINGS

This invention will be described with respect to the particular embodiments thereof, and reference will be made to the drawings, in which:

FIG. 11 illustrates a work cell throughput report output from the work cell activity module logic according to the present invention;

FIG. 13 illustrates a daily real production summary output from the manager report module logic according to the present invention;

FIG. 14 illustrates a workorder summary report output from the work cell activity module logic according to the present invention;

FIG. 16 illustrates a stocknumber bottleneck report output from the bottleneck costing module logic according to the present invention;

FIG. 18 illustrates a value creation report output from the value creation logic according to the present invention.

DETAILED DESCRIPTION OF THE INVENTION

Figure 1:
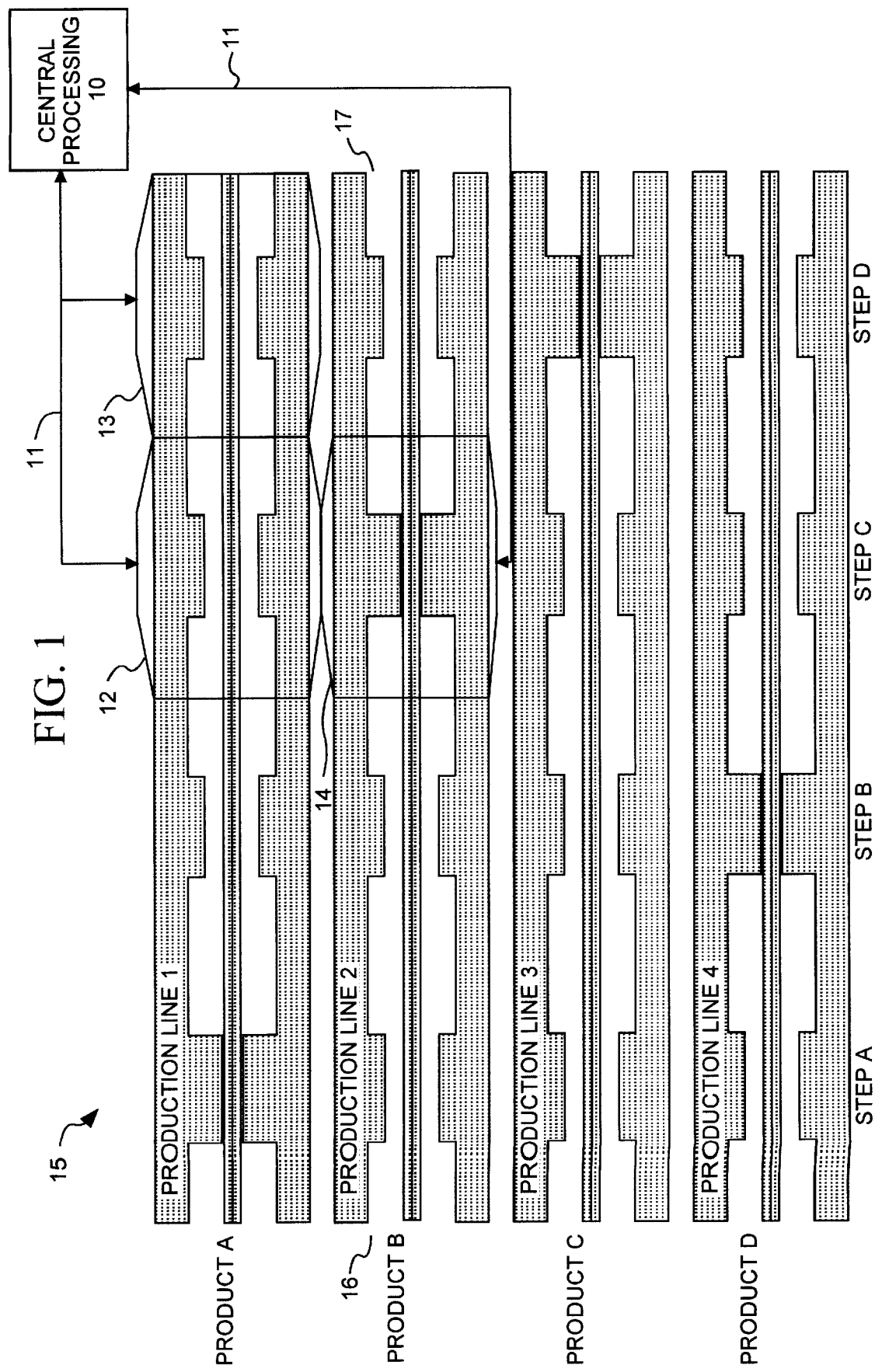
FIG. 1 illustrates a manufacturing facility having a plurality of production lines and a plurality of process steps according to the present invention.

FIG. 1 illustrates a manufacturing facility 15 according to the present invention. In an embodiment, manufacturing facility 15 includes production lines 1–4. Production lines 1–4 manufacture products A–D. The beginning of a production line is identified by reference number 16, while the end of the production line is identified by reference number 17. In each production line, there are a number of processing steps A–D. In an alternate embodiment, there may be far greater or lesser production lines and process steps. Also, various production lines could be located at different manufacturing facility locations.

In an embodiment of the present invention, a lead frame manufacturing facility produces multiple types of lead frames for various semiconductor devices. Product A is a lead frame having only 8 leads, while product B is a lead frame having 208 leads. In the lead frame manufacturing facility embodiment, step A may include a dry etching process step, wet etching process step, or a stamping process step. Process step B could include a plating step, while steps C and D could include cut/tape and sort/pack process steps, respectively.

In alternate embodiments, product A and product B could be the same product having the same stocknumber. Moreover, a number of units which have completed process step A in production line 1 could undergo process step B in production line 1 or process step B in production line 2. While the present invention has been described in terms of a production line, the present invention also may be implemented in a job shop environment where units are being processed or transferred from one job shop location or work cell to another job shop location or work cell.

Manufacturing facility 15 is also partitioned into work cells. For example, work cells 12, 13 and 14 are indicated in production line 1 and production line 2. A work cell may also include a plurality of teams and may have multiple shifts or periods of time during the day when a given group in a work cell completes or is responsible for a particular process step. A work cell team includes a number of workers responsible for a particular process step. In the present embodiment, 7 workers would be assigned to a particular work cell team. More or less workers could also be assigned to a particular work cell team. Time and quantity information associated with each work cell is obtained and transferred on network 11 to central processing 10. While FIG. 1 only illustrates 3 work cells, it should be understood that, preferably, each process step in a production line would have an associated work cell.

Each production line and/or process step may have an associated bottleneck. For example, production line 2 in work cell 14 illustrates a bottleneck in the manufacture of product B. A bottleneck is defined as the process step in a given production line which limits the capability, for various reasons, of the ultimate manufacture of a product. The bottleneck step is the step which yields the fewest units per minute of processing time. Like the bottleneck on a freeway, or the rate limiting step in a chemical reaction, the manufacturing bottleneck step determines the rate at which a product type in a specific work order size may flow through the entire factory. Bottlenecks will be discussed in particular detail below.

Figure 2:
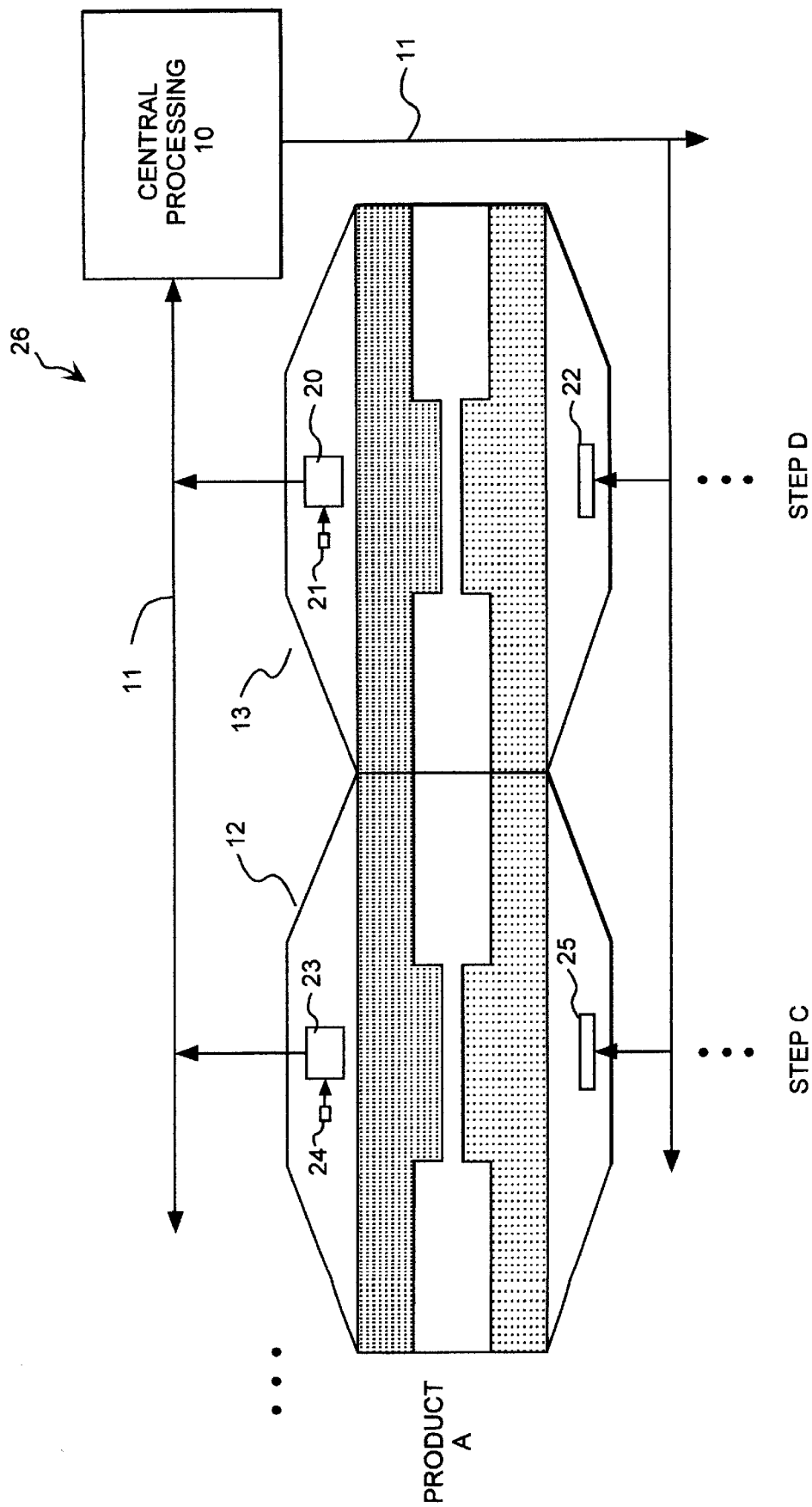
FIG. 2 illustrates a portion of the manufacturing facility shown in FIG. 1 which includes work cells according to the present invention.

FIG. 2 illustrates a portion of the manufacturing facility 15 as shown in FIG. 1. In particular, FIG. 2 illustrates a cycle time costing system 26 according to the present invention. Work cells 12 and 13, for example, communicate with central processing 10 by bus 11. In the preferred embodiment, central processing 10 includes a Hewlett Packard 9000 server supplied by Hewlett Packard ("HP"), located at Santa Clara, Calif., and a personal computer, supplied by International Business Machines, Inc. ("IBM"), located at Armonk, N.Y. In an embodiment, bus 11 is a local area network.

In an embodiment, work cell 13 and work cell 12 include local processing devices 20 and 23, respectively, which are coupled to bus 11. In an embodiment, local processing devices 20 and 23 are personal computers supplied by IBM. Local processing devices 20 or 23 have associated keyboards and displays. The keyboard may be used to input work cell time and quantity data. Local processing devices 20 and 23 are also coupled to bar code scanners 21 and 24 in order to input work cell time and quantity data. The bar code scanners may be connected directly by wire to the local processing device or connected by wireless communication such as radio frequency signals. Bar code scanners may obtain work cell time and quantity information from bar codes on a shop packet.

In an embodiment, the bar code scanners are supplied by Intermec, Inc., located at Everett, Washington. Work cell time and quantity data is transferred to central processing unit 10 via bus 11 by using bar code scanners 21 and 24 and/or a keyboard coupled to local processing devices 20 and 23.

Cycle time costing data, calculated from work cell time and quantity data, is output on bus 11 to local processing unit 20, 23 and/or displays 22 and 25. In addition, the cycle time costing data may be printed. While each work cell may have a local processing apparatus, bar code scanner and display, in alternate embodiments, work cells may share local processing devices, bar code scanners and displays coupled to bus 11.

In an embodiment, the present invention calculates the cost of manufacturing a product (apart from raw material cost) by using a Cycle Time Charge ("CTC"). The Cycle Time Charge reflects the actual cost of manufacturing by absorbing the expenses of the manufacturing plant over the capacity of the plant's bottleneck, which determines the effective capacity of the plant.

Cycle Time Charge is defined as:

$$CTC = \text{Operating Expenses/Operating Minutes} \qquad \text{(Equ. 1)}$$

Operating Expenses are the total expenses of the plant, including payroll and depreciation, but excluding raw materials. Operating Minutes are determined for the plant's bottleneck by taking the number of days available for manufacturing, minus shutdown days, multiplied by the number of hours in the day that manufacturing takes place, multiplied by 60 minutes per hour, multiplied by the number of production lines in the bottleneck.

When the Cycle Time Charge is applied to the Net Cycle Time Rate, described below, the cost per unit for a product can be determined.

In typical MRP systems, the cost associated with a finished product would be determined by adding the various process steps raw materials costs per unit, and possibly labor costs, to obtain a final cost of a finished product. This method of obtaining cost information does not take into account the time associated with each process step or factory cash contribution per unit. MRP systems do not obtain quantity and time information associated with each work cell in order to determine more accurate cost and efficiency information. For example, MRP systems would not be able to determine how much time is actually taken in setting up a process step machine or preparing units to be processed and how much time is actually associated with the actual processing. Moreover, these MRP systems do not accurately account for the amount of scrap units associated with each process step or identify which work cell is responsible for creating the scrap units. For example, process step A may generate scrap units which are not detected until process step C. Thus, process step A should be charged for the scrap units.

Figure 3:
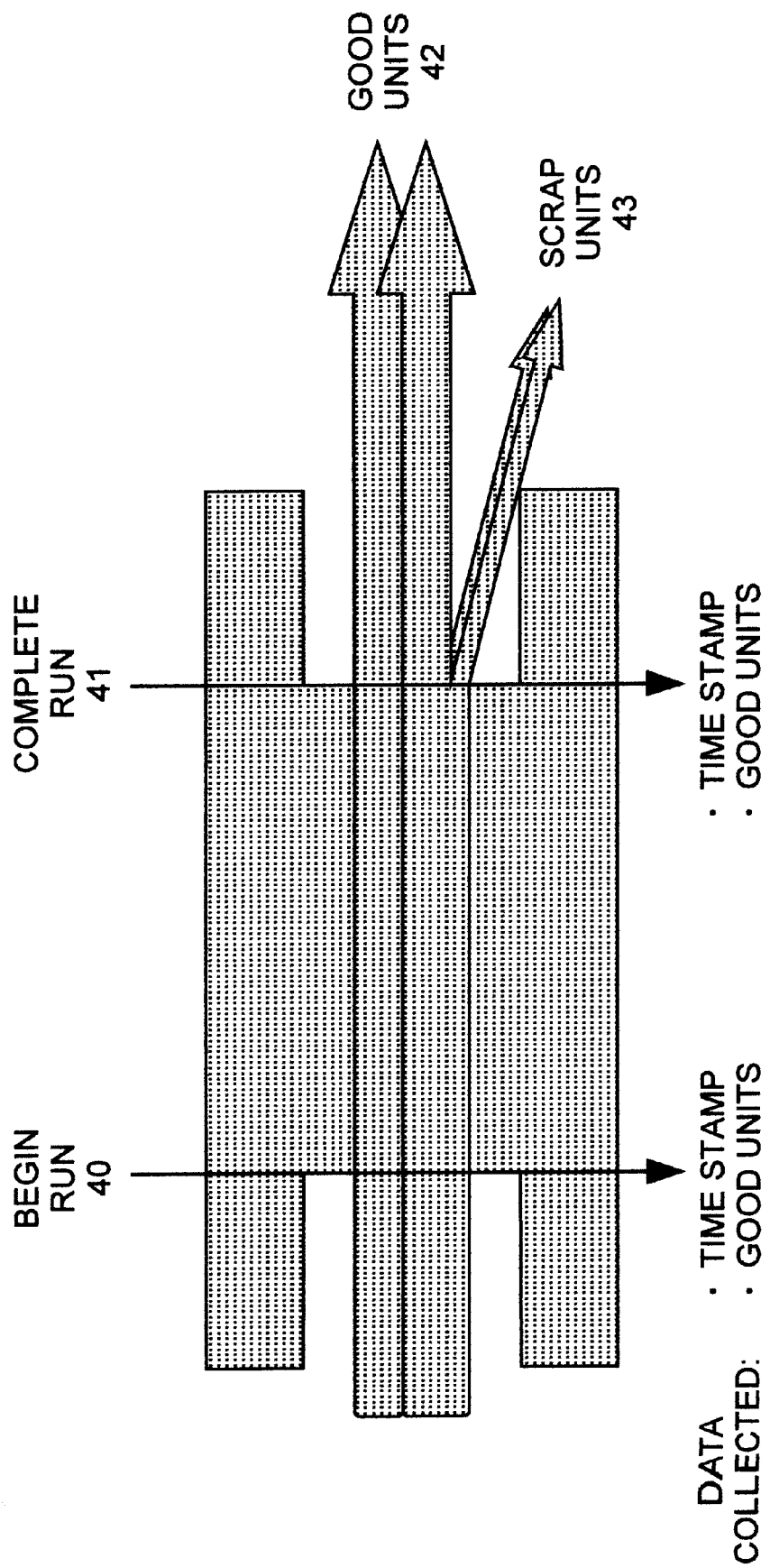
FIG. 3 illustrates outputting unit quantity information from a work cell, including good units and scrap units after completing a process step according to the present invention.
Figure 4:
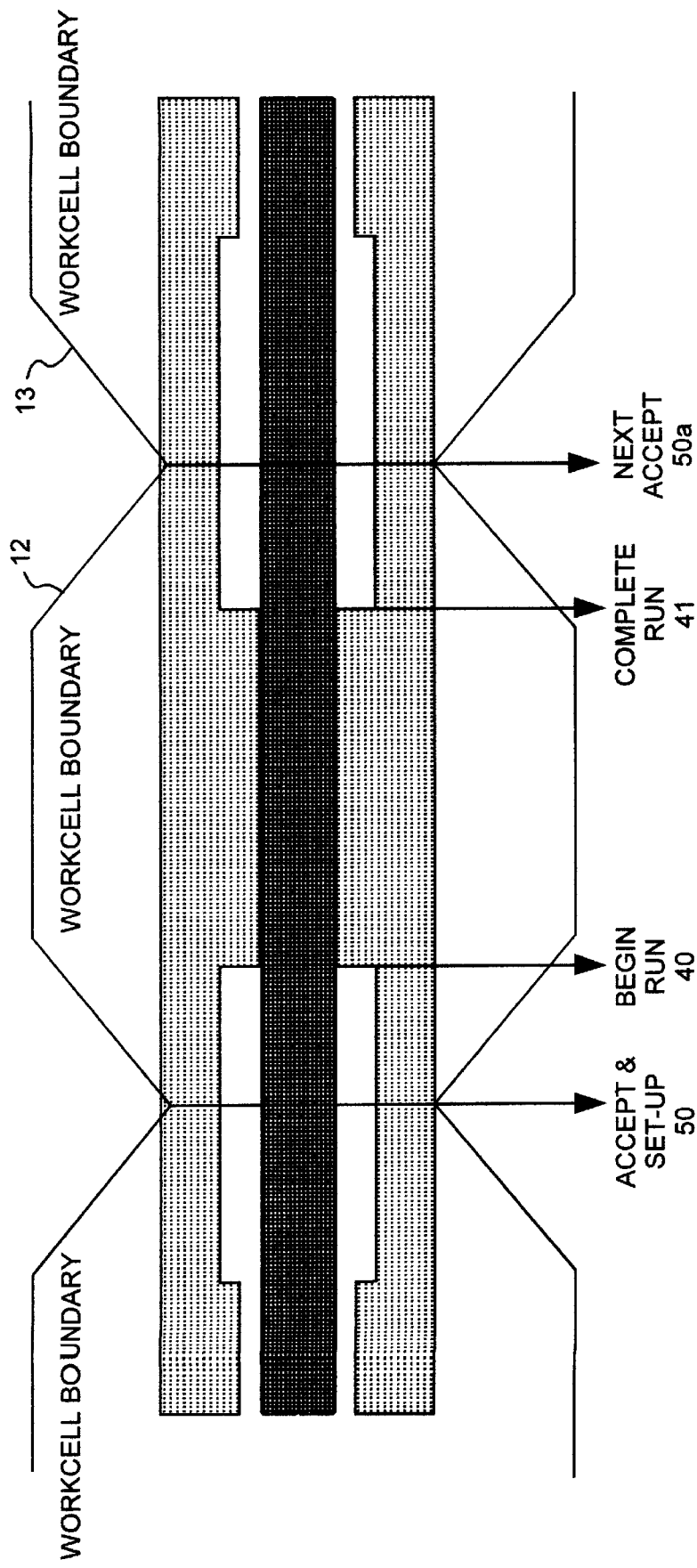
FIG. 4 illustrates outputting timing information from a work cell, including accept, begin and complete timing data, of a typical process step in a work cell according to the present invention.

FIGS. 3 and 4 illustrate how time and quantity data is obtained from each work cell. A worker in a work cell begins the set-up for processing a workorder/lot by inputting the accept quantity ("AQ") number into a local processing device. The local processing device then time stamps the AQ quantity at accept and set-up 50 time ("ATD") in FIG. 4. Similarly, when the production run of a process step is initiated in a work cell, a worker must input into a local processing device the begin run time 40 ("BTD") and the complete run time 41 ("CTD") when the production run is initiated and completed, respectively. Immediately prior to the completion of a process step, a worker will input the quantity of good units 42 ("CQ"). Local processing devices may automatically time date or identify BTD time and CTD time when a worker inputs quantity of units processed by either a bar code scanner or keyboard. As the worker inputs the ATD time, BTD time, CTD time, AQ quantity and CQ quantity data, either directly or indirectly by local processing device time stamps, worker's badge number, shift number and manufacturing location are also input.

The next work cell, for example, work cell 13, will then likewise have a worker input the AQ quantity and ATD time, which is also the next accept ("NAQ") quantity and next accept time ("NATD") 50(a) for work cell 12, in a local process device in work cell 13. For example, when a worker in work cell 13 inputs an AQ quantity and ATD time, central processing 10 automatically assigns the AQ quantity and ATD time in work cell 13 as the NAQ quantity and NATD time for work cell 12.

Figure 5:
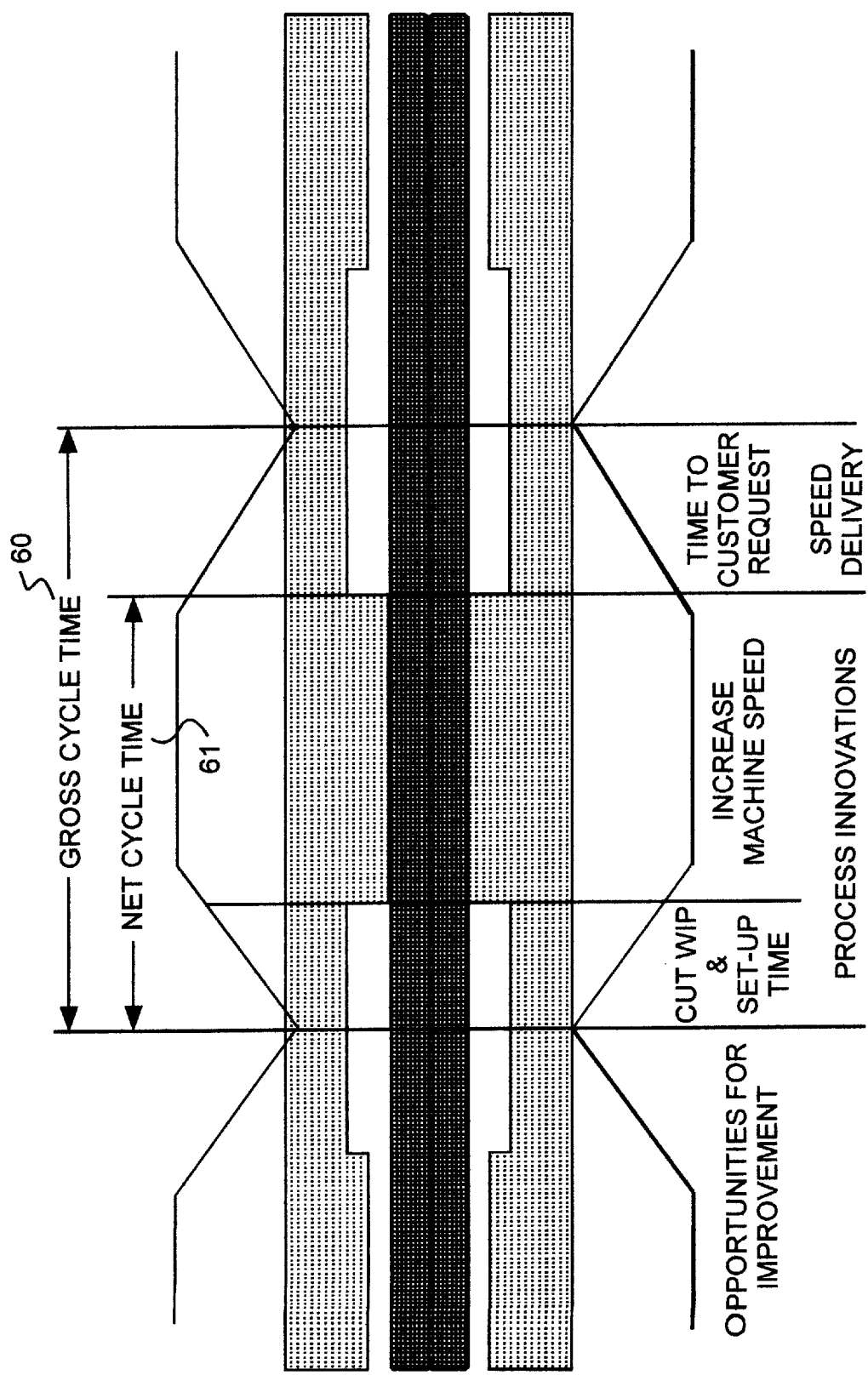
FIG. 5 illustrates work cell gross cycle time and net cycle time according to the present invention.

Because each work cell is responsible for inputting unit quantity and time information into a local processing device, as discussed above, central processing 10 is able to calculate cycle time costing information in each work cell. For example, gross cycle time 60, shown in FIG. 5, for a particular work cell and in particular workorder and lot, can be obtained. This information indicates how long a work cell was responsible for a workorder/lot. This includes set-up time, production run time and queuing time (wait time) for the next process step, if necessary. Equations 2 through 10 refer to cycle time cost information per lot of a given workorder. Gross cycle time 60 is defined as:

$$WWGCT = NATDw_j I_t c_y p_z - ATDw_j I_t c_y p_z \qquad \text{(Equ. 2)}$$

where:
WWGCT is Work cell/Workorder/Lot Gross Cycle Time;
NATD is Next Accept Time/Date;
ATD is Accept Time Date;
$w_j$ is Workorder/Job Number;
$c_y$ is Team (for example, y=1 to 5);
$p_z$ is Process Step (for example, z=A to D); and
$I_t$ is Lot or portion of a workorder With work cell gross cycle time calculated, workorder gross cycle time rate is calculated by:

$$WWGCTR = WWGCTw_j I_t c_y p_z / NAQw_j I_t c_y p_z \qquad \text{(Equ. 3)}$$

where:

WWGCTR is Work cell/Workorder/Lot Gross Cycle Time Rate; and
NAQ is Next Accept Quantity.

Likewise, net cycle time 61 can be obtained. Net cycle time indicates how long a particular workorder, or a lot in a workorder, took to complete a process step, for example, the time period from accept and set-up 50 to completion run 41. Net cycle time is defined as $$WWNCT = CTDw_j I_t c_y p_z - ATDw_j I_t c_y p_z \qquad \text{(Equ. 4)}$$

where:
WWNCT is Work cell/Workorder/Lot Net Cycle Time;
CTD is Complete Time/Date;
ATD is Accept Time/Date;
$w_j$ is Workorder/Job Number;
$I_t$ is Lot or portion of a workorder
$c_y$ is Team (for example, y=1 to 5); and
$p_z$ is Process Step (for example, z=A to E).

As with gross cycle time rate per work cell, net cycle time rate per work cell is defined as:

$$WWNCTR = WWNCTw_j I_t c_y p_z / NAQw_j I_t c_y p_z \qquad \text{(Equ. 5)}$$

where:
WWNCTR is Work cell/Workorder/Lot Net Cycle Time Rate; and
NAQ is Next Accept Quantity.

Central processing 10 can also obtain cycle time costing information for a workorder or a lot in a workorder completing multiple process steps in a production line. This information measures the total elapsed time from beginning of set-up for the first process step to acceptance of the workorder/lot by finished goods inventory or by the end-use customer.

$$WGCT = NATDw_j I_t c_y p_5 - ATDw_j I_t c_y p_1 \qquad \text{(Equ. 6)}$$

where:
WGCT is Workorder/Lot Gross Cycle Time; and
the product required 5 process steps (A through E).

Likewise, net cycle time for a workorder or a lot in a workorder completing multiple process steps in a production line is defined as the sum of net cycle times for all work cells processing the workorder/lot:

$$WNCT = \Sigma CTDw_j I_t c_y p_z - ATDw_j I_t c_y p_z \text{ (for example, z=1 to 5)} \qquad \text{(Equ. 7)}$$

where:
WNCT is Workorder/Lot Net Cycle Time; and
the product required 5 process steps (A through E).

Gross flow rate and net flow rate for a lot in a workorder are defined below.

$$WGFR = NAQw_j I_t / GCTw_j I_t \qquad \text{(Equ. 8)}$$

$$WNFR = NAQw_j I_t / NCTw_j I_t \qquad \text{(Equ. 9)}$$

where:
WGFR is Gross Flow Rate; and
WNFR is Net Flow Rate.
Gross flow rate and net flow rate for a work cell may be similarly calculated.

Finally, lot per workorder yield and flow efficiency are defined as:

$$WY = NAQw_jI_t/AQw_jI_t \qquad \text{(Equ. 10)}$$

$$FE = WNCT/WGCT \qquad \text{(Equ. 11)}$$

where:
WY is Yield; and
FE is Flow Efficiency.

Work cell yield and flow efficiency may also be calculated similarly.

Figure 6:
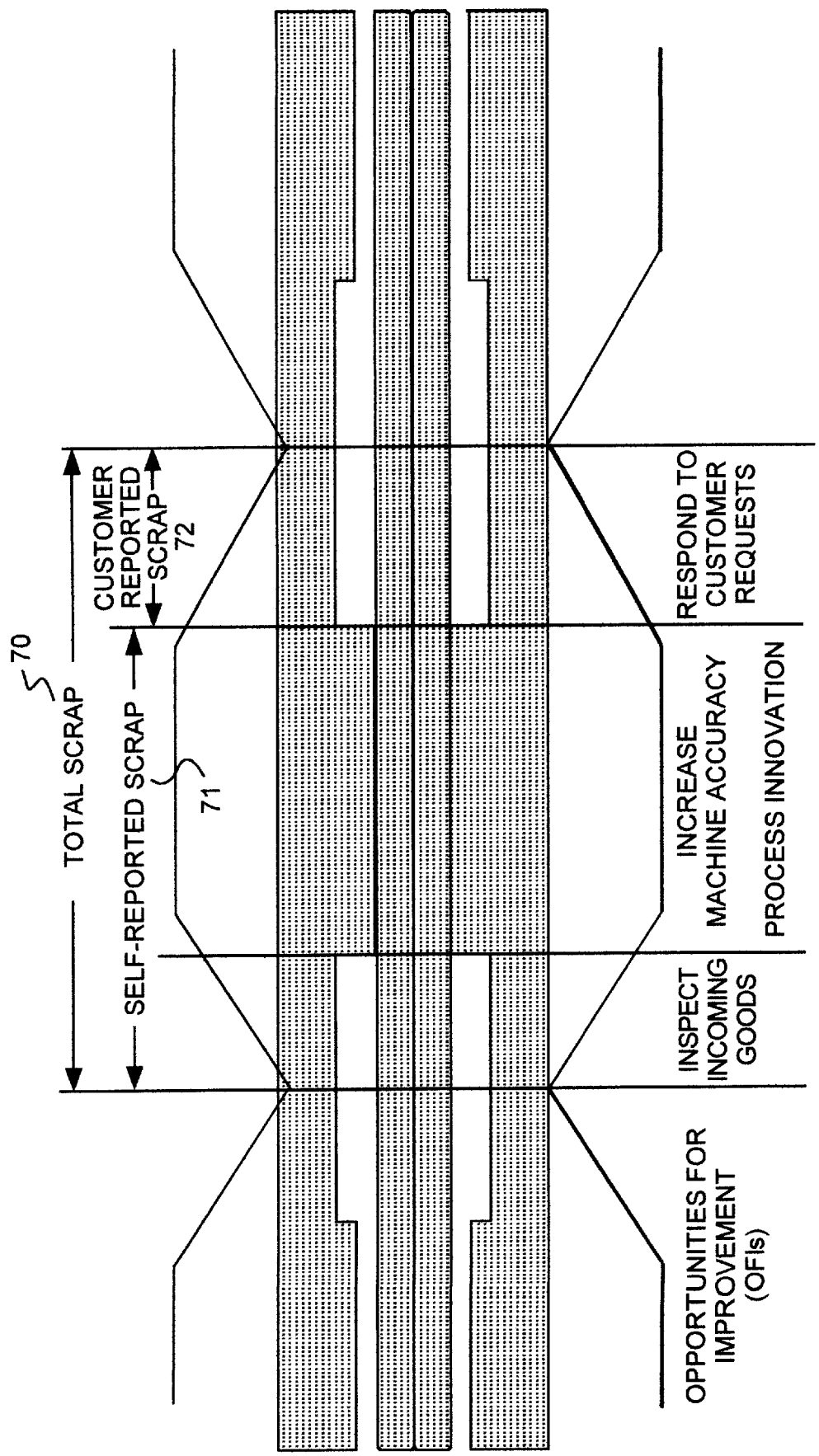
FIG. 6 illustrates work cell produced scrap according to the present invention.

By calculating the cycle time cost information above for each work cell and for all work cells in a production line which process a completed product, a large amount of cycle time costing information is obtained to identify opportunities for improving the manufacturing process. For example: 1) work in progress (WIP) may be cut; 2) set-up time for process machines can be reduced; 3) process or machine speed may be increased, if possible; 4) process innovations in a particular work cell may be more effectively evaluated; 5) quantities output from particular work cells may be timed to customer requests or next work cell requests and delivery speed to the next work cell can be increased. Likewise, FIG. 6 illustrates how the present invention identifies scrap from a work cell. Identifying total scrap 70 in FIG. 6, which includes self-reported scrap 71 and customer-reported scrap 72, also creates opportunities for improvement in the manufacturing process. If individual work cells will be charged for their scrap units, workers will be more inclined to: 1) inspect incoming goods; 2) increase machine accuracy; 3) look to process innovations which reduce scrap; and 4) respond to customer requests in order to reduce customer-reported scrap 72.

Figure 7:
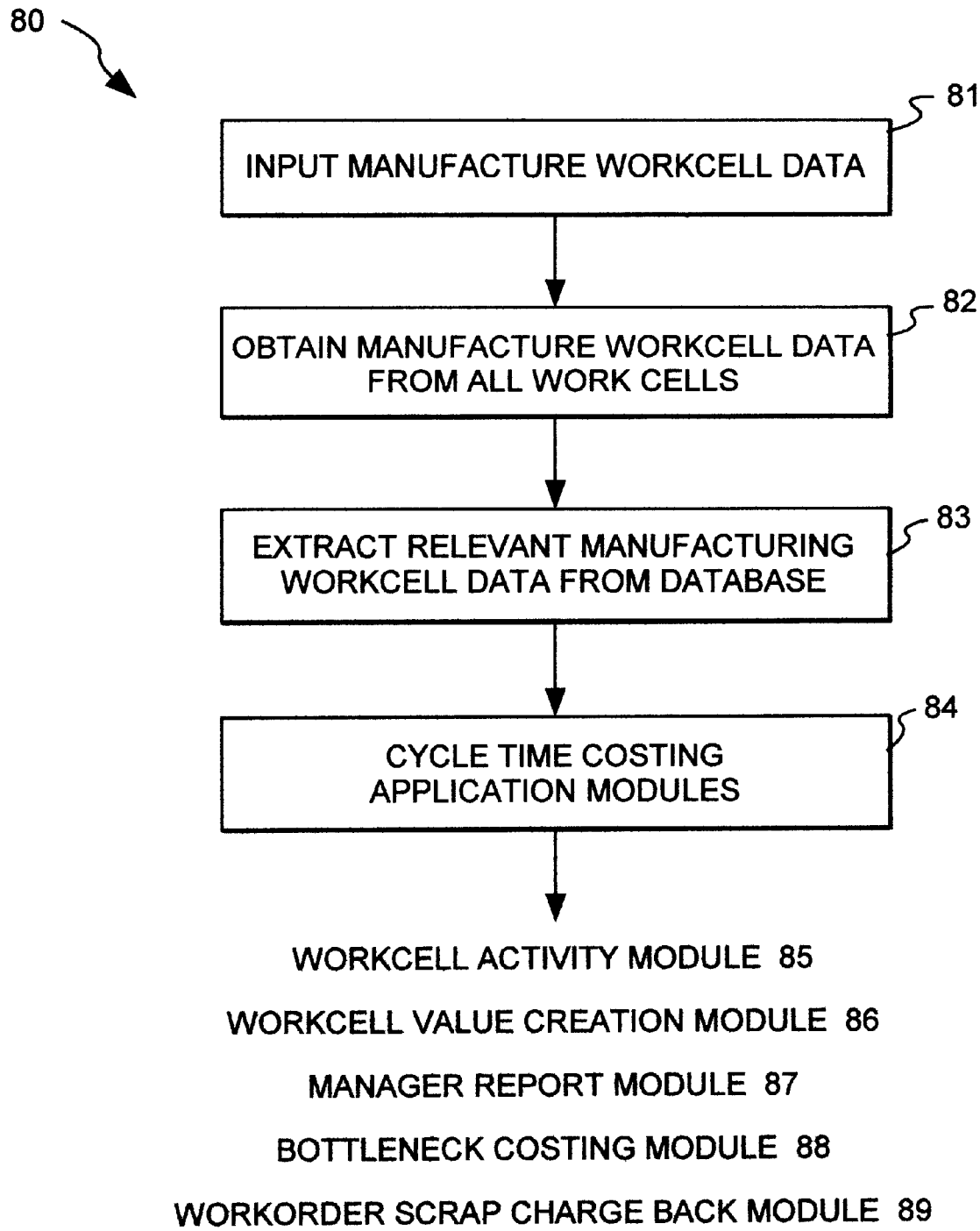
FIG. 7 illustrates the cycle time costing logic flow according to the present invention.

FIG. 7 illustrates logic flow 80 of the cycle time costing system 26 according to the present invention. Quantity and time information are input at respective work cells in logic block 81. As described above, quantity and time information may be input by either a bar code scanner, keyboard, combination thereof, or other input device means. Cycle time costing system 26 then obtains work cell data from each work cell in the manufacturing facility 15 in logic block 82. As described above, one embodiment obtains manufacturing work cell data in cycle time costing system 26 by using a MRP CHESS software package and an HP 9000 server coupled to a local area network. Relevant work cell data is then extracted from a database in logic block 83. In an embodiment, relevant work cell data is extracted using a CHESS data extract file of fixed width format. Finally, various cycle time costing application modules 84 then may be used in order to calculate the selected data. Cycle time costing application modules 84 include: 1) work cell activity module 85; 2) work cell value creation module 86; 3) manager report module 87; 4) bottleneck costing module 88; and 5) workorder scrap chargeback module 89. In an embodiment, the above modules are software application routines using Excel 5.0, supplied by Microsoft, located at Redmond, Wash., on a personal computer in central processing 10. In alternate embodiments, cycle time costing applications could be designed in hardware using various hardware logic.

Figure 8:
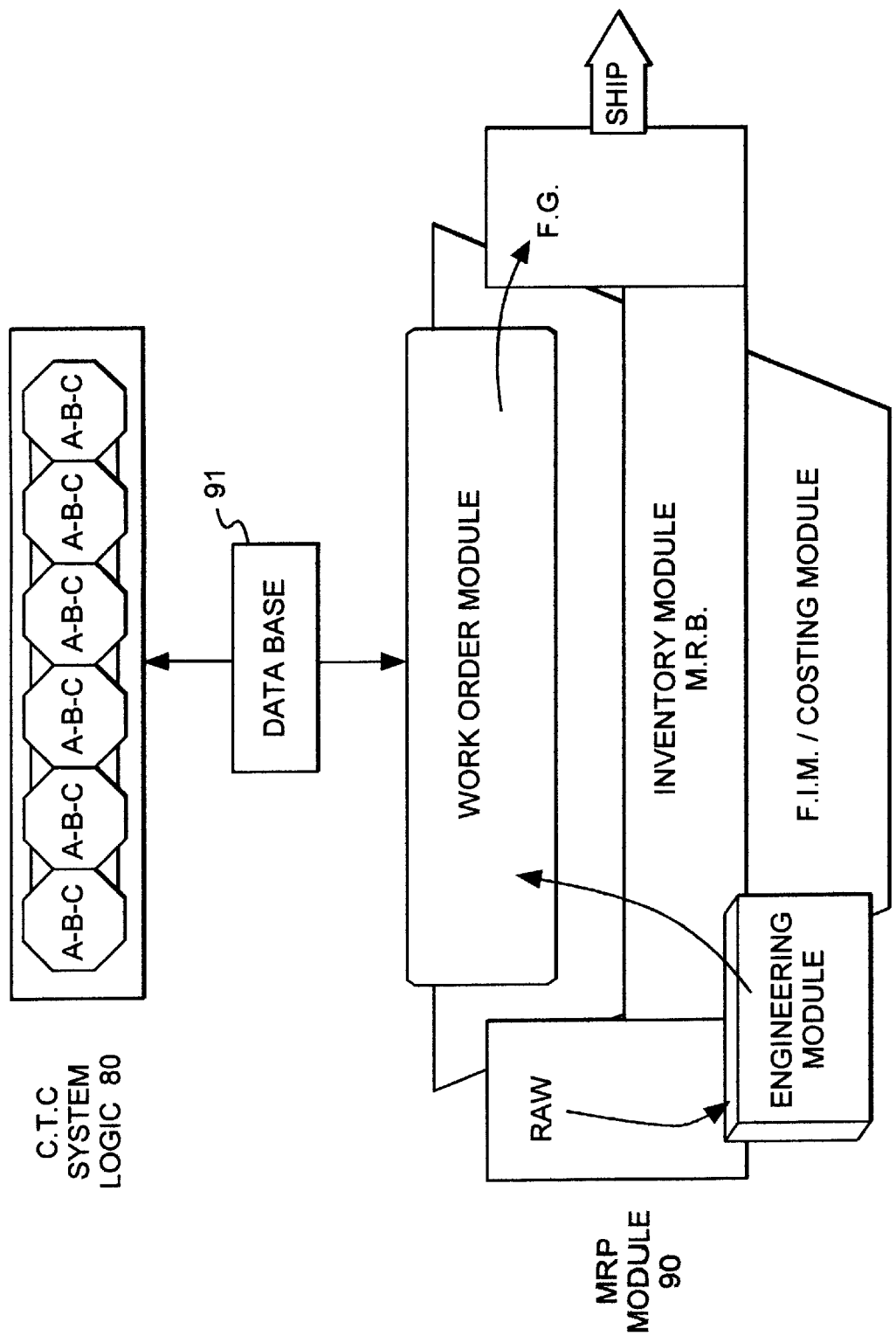
FIG. 8 illustrates the interface between the cycle time costing system and a manufacturing resource planning ("MRP") module according to the present invention.

FIG. 8 illustrates the interface between cycle time costing system logic 80 and an MRP module 90. In an embodiment, MRP module 90 is a Chess system which includes a workorder module, an inventory module, costing module and engineering module. The cycle time costing logic 80 obtains work cell data from a common database 91. In a preferred embodiment, the database is an Oracle database supplied by Oracle, located at Long Beach, Calif.

Figure 9:
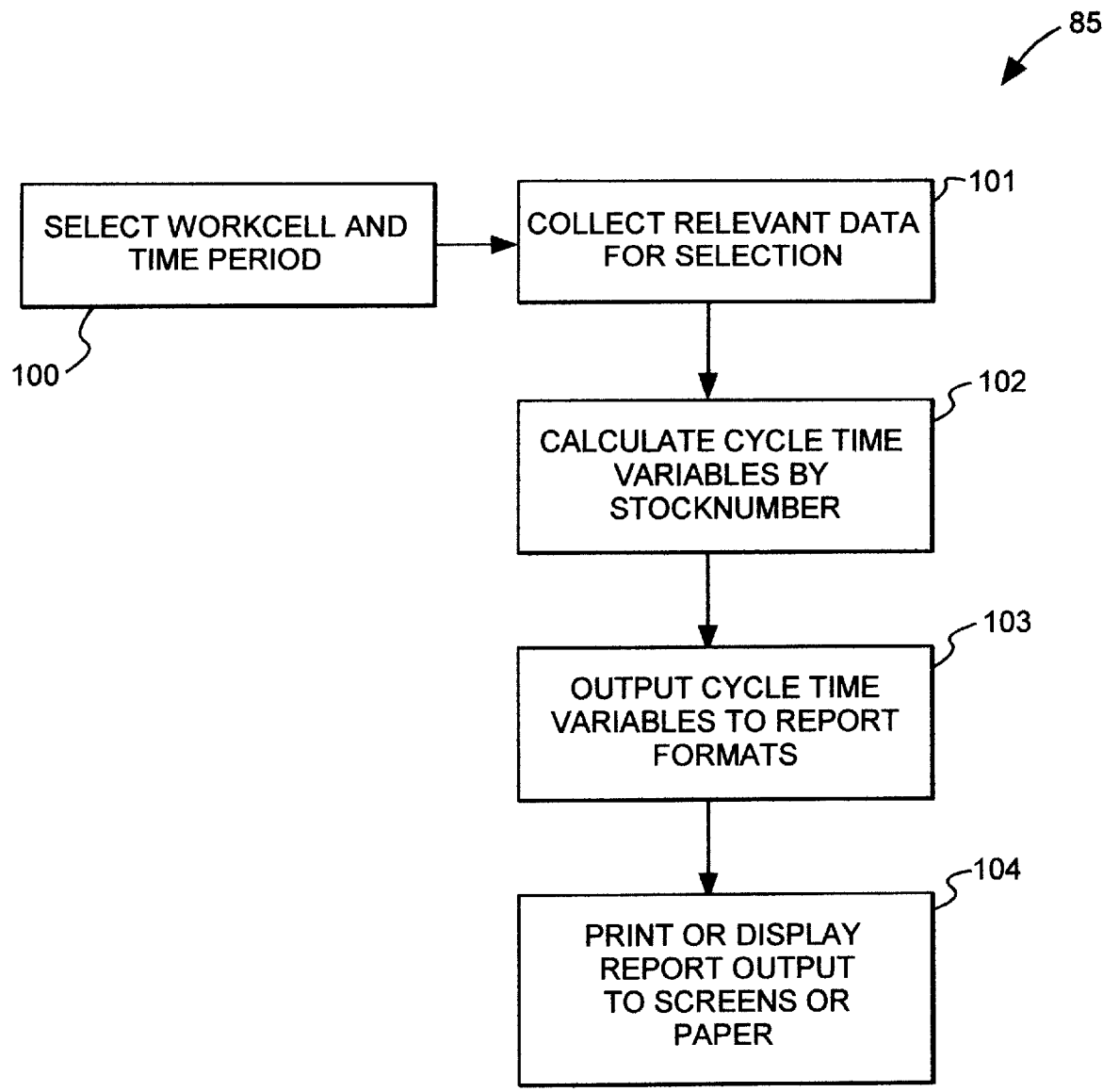
FIG. 9 illustrates a work cell activity module logic according to the present invention.

FIG. 9 illustrates the logic flow of the work cell activity module 85 illustrated in FIG. 7. Work cell activity module logic 85 identifies workorders completed by selected work cells during a selected time period. Logic block 100 selects a work cell and time period. Work cell data is then collected for the selected work cell and selected time period in logic block 101. Cycle time costing variables by stocknumber are calculated in logic block 101. Cycle time costing variables, which are calculated in logic block 102, include: 1) gross cycle time; 2) net cycle time; 3) net flow rate; 4) gross cycle time rate; 5) net cycle time rate; and 6) yield. Cycle time costing variables are then output to a report format in logic block 103. Finally, the report formats are either printed or displayed on a screen in logic block 104.

Figure 10:
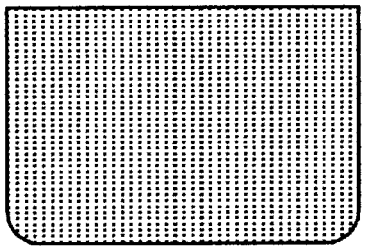
FIG. 10 illustrates a work cell yield report output from the work cell activity module logic according to the present invention.

FIGS. 10 and 11 are example report formats. The report formats may be output at: 1) screen or printers at central processing 10; 2) local processing printers or screens 20 and 23 shown in FIG. 2; or 3) projected on large screens 22 or 25 in FIG. 2. Thus, work cells have immediate information as to cycle time costing variables in order to identify bottlenecks and improve efficiency. Likewise, managers at central processing 10 also have cycle time costing information.

FIG. 10 illustrates a report format output from work cell activity module 85 in FIG. 9. FIG. 10 illustrates a work cell yield report for a work cell completing a cut/tape process step. The team and shift is yellow and three, respectively. The time period selected is from Mar. 19, 1995 to Mar. 25, 1995. As can be seen, a list of stocknumbers associated with a given product is listed in a first column. Accepted and completed quantities for each stocknumber are listed in columns 3 and 4. Individual throughput rates and scrap rates associated with each product are also calculated and listed in columns 5 and 6. Finally, yields are listed in the final column.

For example, on the first line, 13.38K of stocknumber 50802 was accepted by the yellow team cut/tape work cell from Mar. 19, 1995 to Mar. 25, 1995. The cut/tape work cell then completed 13.25K units of stocknumber 50802 during the selected time period. The product had a throughput quantity of 13.25K and a scrap quantity of 0.13K. This resulted in 99% yield.

Similarly, FIG. 11 illustrates a work cell throughput report for the yellow team cut/tape work cell during shift 3 at the time period from Mar. 19, 1995 through Mar. 25, 1995. As in FIG. 10, individual stocknumbers are listed on the left-hand column with throughput quantity and yields for individual stocknumbers listed in columns 3 and 4. Average gross cycle time and average net cycle time per lot are also output in a days: hours: and minutes: format. Finally, net flow rate is likewise listed in the final column.

Figure 12:
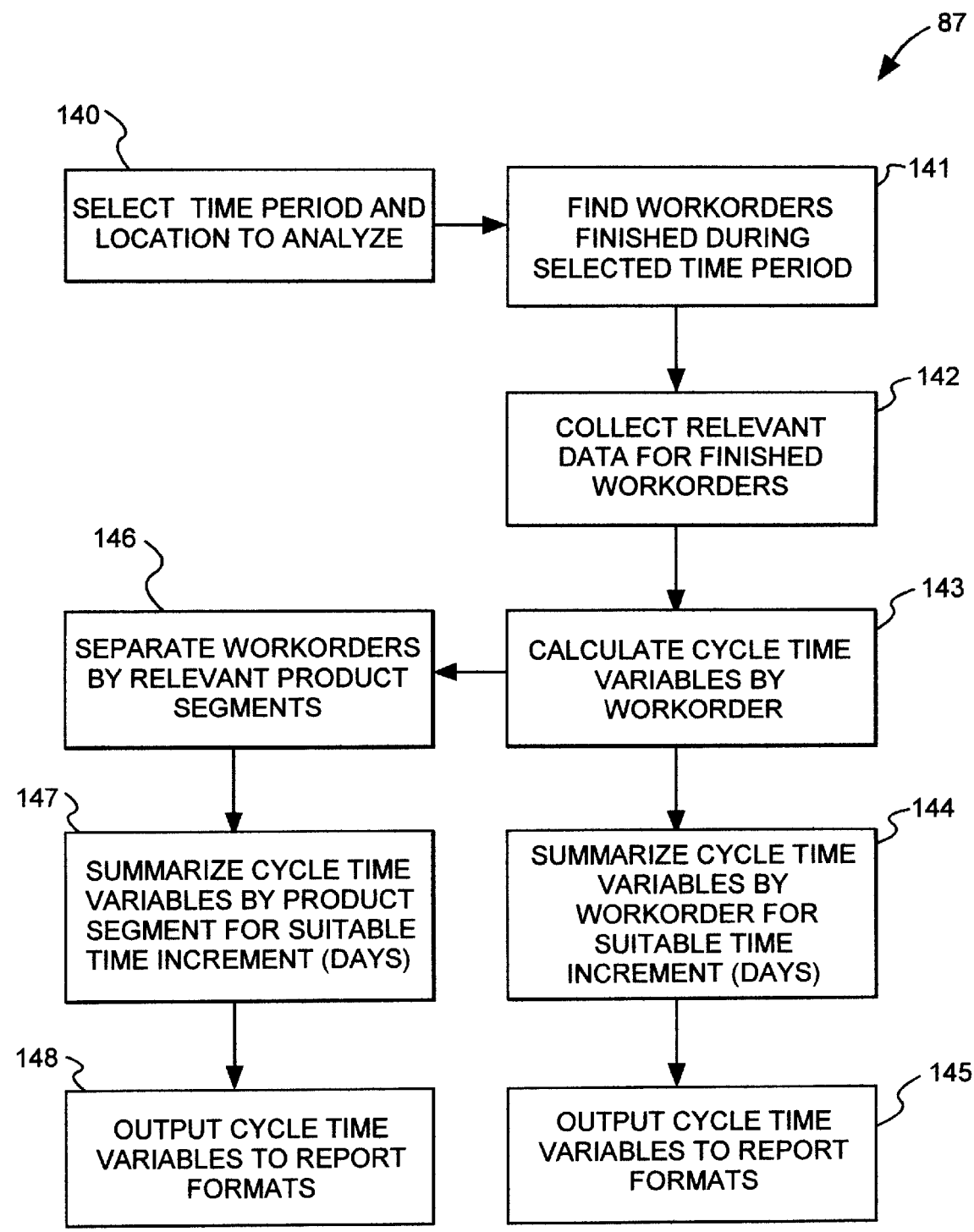
FIG. 12 illustrates a manager report module logic according to the present invention.

FIG. 12 illustrates manager report module logic 87 identified in FIG. 7. Logic block 140 selects the time period and manufacturing facility location to analyze. Logic block 141 then collects the workorders completed during the selected time period. Logic block 142 collects work cell data relevant to the completed workorders. Logic block 143 then calculates cycle time costing variables by workorder. The calculated cycle time costing variables in logic block 143 then may be summarized by workorders for suitable time increments in logic block 144 or separated by relevant product segments in logic block 146. The output from logic block 146 is input to logic block 147 which summarizes cycle time costing variables by product segment for a suitable time increment. Both outputs of logic blocks 147 and 144 are input to cycle time costing report formats in logic block 148 and logic block 145, respectively.

FIG. 13 illustrates a report format output from logic block 145 in FIG. 12. FIG. 13 illustrates a daily reel production summary for the selected period from Mar. 26, 1995 through Apr. 1, 1995. Among other cycle time costing variables, gross cycle time and net cycle time is displayed. Likewise, gross cycle time and net cycle time per reel are also summarized. Various cycle time costing variables are identified on a per-day basis from Mar. 26, 1995 through Apr. 1, 1995. For example, on Mar. 27, 1995, 10 reels were finished, producing 74K units. The gross cycle time and net cycle time was 46.62 hrs./K and 16.92 hrs./K, respectively. The yield was approximately 64%, with a flow efficiency of 36%. Net raw materials cost was $3,388 and scrap cost was $1,782, with a total cost of $5,170.

FIG. 14 also illustrates a cycle time costing workorder summary report output from work cell activity module logic 85. The workorder summary report identifies workorder 6211, and specifically lot 1 identified under the third ("Line") column. The workorder identifies stocknumber A58447 going through the dry etching, wet etching, plating, taping, cutting and sort/pack process steps in respective work cells. Employee names identifying accepting the various unit quantities into each work cell are also identified along with date and time information.

Figure 15:
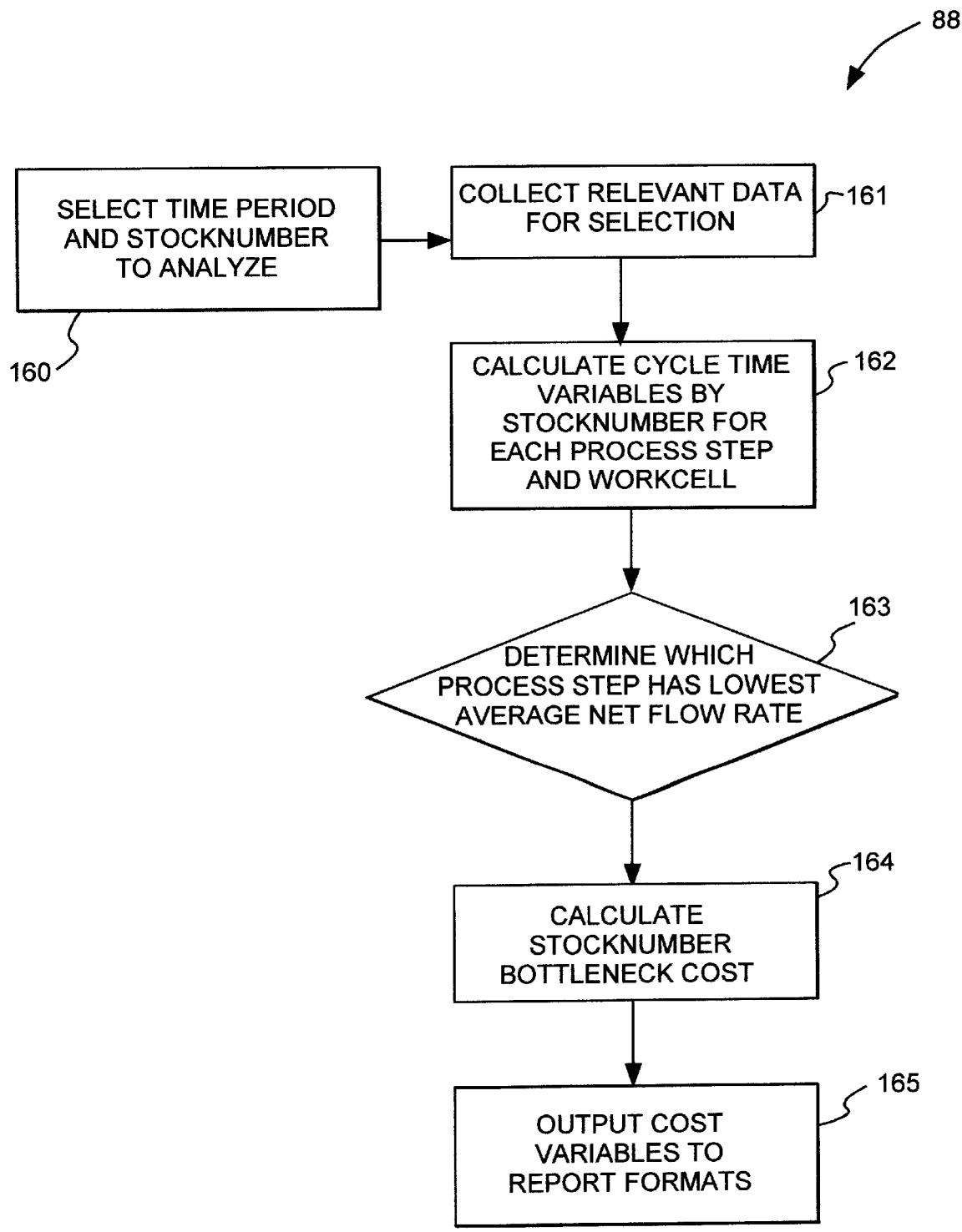
FIG. 15 illustrates a bottleneck costing module logic according to the present invention.

FIG. 15 illustrates the bottleneck costing module logic 88 identified in FIG. 7. A time period and stocknumber is selected in logic block 160. Relevant work cell data is then collected in logic block 161. Cycle time costing variables by stocknumber for each process step and work cell is calculated in logic block 162. The average net flow rate is then determined for each process step in logic block 163. From among the calculated average net flow rates for each process step, the lowest average net flow rate determines the bottleneck. Stocknumber bottleneck cycle time cost is calculated in logic block 164 and outputted to logic block 165 which generates a report format. The stocknumber bottleneck cycle time cost is calculated in logic block 164 by determining the relationship of the bottleneck process step net cycle time rates to the quantity of good units produced. This relationship is established using standard linear regression techniques. A relationship other than linear, e.g., exponential or logarithmic, could also be established or used.

The stocknumber/lot raw material cost ("$RMCs_x$") is calculated using the unit raw material cost for the particular stocknumber and dividing by the average net yield of that stocknumber as in Equation 15 below.

Thus, the total bottleneck stocknumber cost is defined as the sum of the bottleneck cycle time cost plus the stocknumber/lot raw material cost.

$$TBCs_x = BCTCs_x + RMCs_x \quad \text{(Equ. 12)}$$

and:

$$Bs_x = \text{Process Step with Minimum } (WNFRs_xp_z) \quad \text{(Equ. 13)}$$

$$BCTCs_x = WWNCTRs_x \text{ (for } Bs_x)*CTC*NAQp_5 \quad \text{(Equ. 14)}$$

$$RMCs_x = RMs_x/\text{Average } WYs_x \quad \text{(Equ. 15)}$$

where:

$Bs_x$ is Stocknumber Bottleneck;

$BCTCs_x$ is Bottleneck Cost; and $RMCs_x$ is Raw Material Cost.

FIG. 16 illustrates a report format from logic block 165. The selected time period is from Feb. 10, 1995 through Feb. 15, 1995. In this example, analyzing a bottleneck by process step, identifies the sort/pack process step is a bottleneck by having a flow rate in parts per hour of 33. Further, analyzing by work cell illustrates that the sort/pack process step has an average net flow rate in parts per hour of 10. The output from this report illustrates that in order to increase average net flow rate and ultimately profit, the sort/pack efficiency must be improved. Although there may be a multitude of reasons why the yellow team's sort/pack process step has a relatively low average net flow rate, the report clearly identifies where in the manufacturing process resources and attention should be focused.

Figure 17:
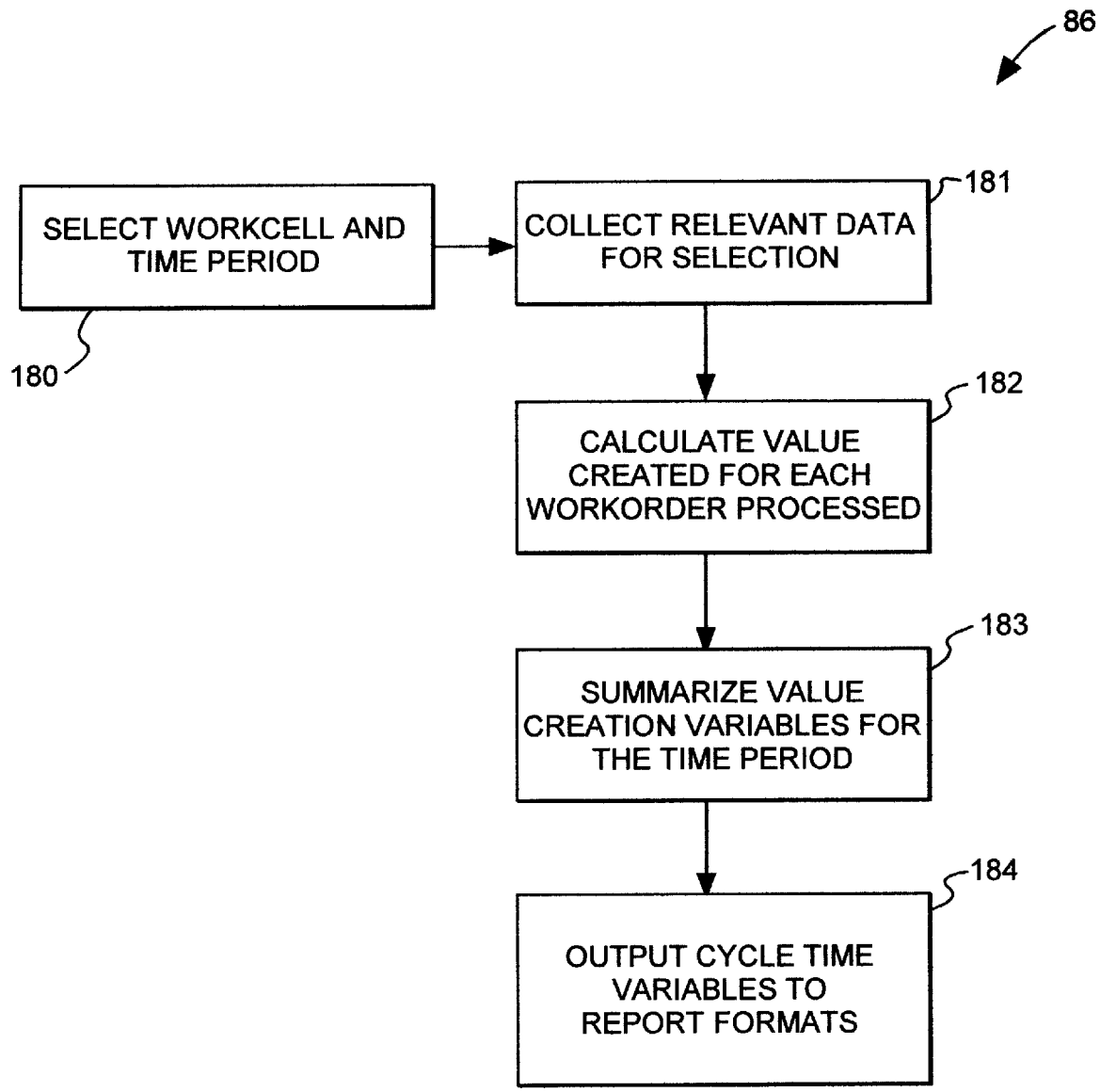
FIG. 17 illustrates a work cell value creation module logic according to the present invention.

FIG. 17 illustrates a work cell value creation module logic 86 identified in FIG. 7. The logic module determines how much value a particular work cell is generating. A work cell and time period is selected in logic block 180. Relevant work cell data for the selected time period and work cell is collected in logic block 181. Value created for each workorder is then calculated in logic block 182 and value creation variables are summarized for the selected time period in logic block 183. Finally, the cycle time costing variables are output in a report format in logic block 184. A value creation report format is illustrated in FIG. 18.

Work cell value created is determined by:

$$VC = WR*WAY*WFE*WLE \quad \text{(Equ. 16)}$$

where:

VC is Value Created;

WR is Work Cell Revenue;

WAY is Work Cell Average Yield;

WFE is Work Cell Flow Efficiency; and

WLE is Work Cell Labor Efficiency.

Work Cell Revenue credits the work cell with the sales value of the good units the work cell produced during the time period selected. Work cell Revenue is defined as:

$$WR = \Sigma NAQw_jl_cy_p_z*ASPs_x \quad \text{(Equ. 17)}$$

Work Cell Average Yield measures the overall yield of the work cell for the period selected. Work Cell Average Yield is defined as:

$$WAY = \Sigma NAQw_jl_cy_p_z / \Sigma AQw_jl_cy_p_z \quad \text{(Equ. 18)}$$

Work Cell Flow Efficiency credits the work cell for the efficient use of processing time. Work Cell Flow Efficiency is defined as:

$$WFE = \Sigma WWNCTw_jl_cy_p_z / \Sigma WWGCTw_jl_cy_p_z \quad \text{(Equ. 19)}$$

Work Cell Flow Efficiency can also be an average weighted by stocknumber or workorder lot volume. Work Cell Labor Efficiency credits the work cell for the efficient use labor in the course of processing units. Work Cell Labor Efficiency is defined as:

$$WLE = \text{Budgeted Labor Cost} c_y p_z / \text{Actual Labor Cost} c_y p_z \quad \text{(Equ. 20)}$$

By applying the three efficiency factors to the total sales value of the product, the value the work cell created can be determined. In using the efficiency factors (WAY, WFE and WLE), the work cell can directly see how to increase value. A work cell can compare its performance with that of other work cells. In addition, a weighting could be applied to the efficiency factors to adjust the relative values of the factors and their impact on value creation, or to provide further incentive to improve a particular efficiency.

Figure 19:
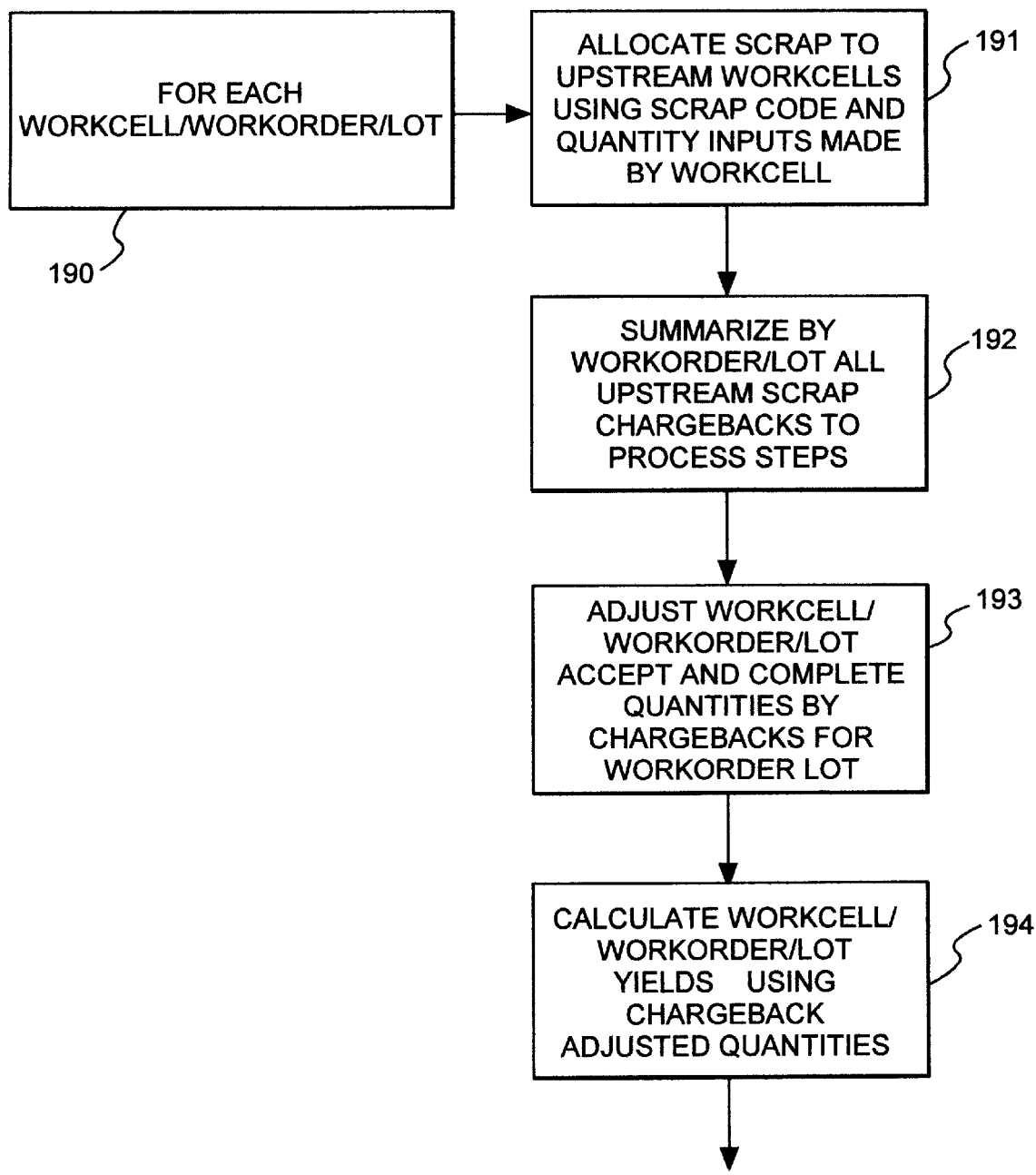
FIG. 19 illustrates a scrap chargeback module logic according to the present invention.

FIG. 19 illustrates a scrap chargeback module logic 89 identified in FIG. 7. Each work cell and workorder is identified in logic block 190. Work cells allocate scrap by using scrap codes and quantity inputs in logic block 191. Depending upon the scrap code and particular work cell reporting the scrap, yields are adjusted. For example, if process step D detects a plating error in a portion of a lot, a worker in a process step D work cell inputs the quantity of the scrap and a scrap code indicating a plating problem. Central processing 10 will then charge customer reported scrap 72, as illustrated in FIG. 6, to the appropriate plating work cell. However, if process step D detects a stamping error in a portion of a lot, a different scrap code would be entered and a particular stamping process step work cell would be assigned a scrap chargeback by central processing 10. Thus, scrap chargebacks are determined by the reporting work cell and scrap code input used. Scrap chargebacks are summarized by process steps in logic block 192. Each work cell and workorder accept quantities AQ and complete quantities CQ are adjusted for chargebacks for a particular workorder in logic block 193. Work cell and workorders yields are then calculated using AQ and CQ quantities adjusted by chargebacks in logic block 194.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. For example, other embodiments which do not include a network or central processing device are possible. A user could input work cell quantity and time data into a processing apparatus, specifically an apparatus memory location, which calculates and outputs cycle time costing data. The cycle time costing data may be output to a display screen, printer, or transferred by other communication media. It is intended that the scope of the invention be defined by the following claims and their equivalents.

What is claimed is:

1. A method for obtaining cycle time costing data for a manufacturing facility having a plurality of production lines, each production line including a plurality of work cells, comprising the steps of:

inputting, into a first input device at a first work cell in the plurality of work cells in a first production line in the plurality of production lines, a first time associated with a first quantity of units to be processed at the first work cell;

inputting, into a second input device at a second work cell in the plurality of work cells in the first production line, a second time associated with a second quantity of units to be processed at the second work cell;

subtracting, by a computer coupled to the first and second input devices, the first time from the second time to obtain a gross cycle time; and displaying the gross cycle time.

2. The method of claim 1, further comprising the steps of:

inputting, into the first input device at the first work cell, a third time associated with the first quantity of units which has been processed; and, subtracting, by the computer, the fit time from the third time to obtain a net cycle time.

3. The method of claim 2, further comprising the step of:

dividing, by the computer, the net cycle time by the second quantity to obtain a net cycle time rate.

4. The method of claim 2, further comprising the step of:

dividing, by the computer, the second quantity by the net cycle time to obtain a net flow rate.

5. The method of claim 1, further comprising the step of:

dividing, by the computer, gross cycle time by the second quantity to obtain a gross cycle time rate.

6. The method of claim 5, further comprising the step of:

dividing, by the computer, the second quantity by the gross cycle time to obtain a gross flow rate.

7. A method for obtaining cycle time costing data for a manufacturing facility having a plurality of work cells, comprising the steps of:

inputting, into a first input device at a first work cell in the plurality of work cells, a first time associated with a first quantity of units to be processed at the first work cell;

inputting, into a second input device at a second work cell in the plurality of work cells, a second time associated with a second quantity of units to be processed at the second work cell;

inputting, into the first input device at the first work cell, a third time associated with the first quantity of units which has been processed by the first work cell;

subtracting, by a computer coupled to the first and second input devices, the first time from the third time to obtain a net cycle time;

dividing, by the computer, the second quantity by the net cycle time to obtain a net flow rate;

obtaining, from the computer, a plurality of net flow rates associated with a product in the plurality of work cells; and displaying the plurality of net flow rates.

8. A method for obtaining cycle time costing data for a manufacturing facility having a plurality of work cells, comprising the steps of:

inputting, into a first input device at a first work cell in the plurality of work cells, a first time associated with a first quantity of units to be processed at the first work cell;

inputting, into a second input device at a second work cell in the plurality of work cells, a second time associated with a second quantity of units to be processed by the second work cell;

inputting, into the first input device at the first work cell, a third time associated with the first quantity of units which has been processed by the first work cell;

subtracting, by a computer coupled to the first and second input devices, the first time from the third time to obtain a net cycle time;

dividing, by the computer, the second quantity by the net cycle time to obtain a net flow rate;

obtaining, from the computer, a plurality of net flow rates associated with a product in the plurality of work cells;

comparing, by the computer, the plurality of net flow rates to obtain a lowest net flow rate in the plurality of flow rates;

obtaining, from the computer, a product's bottleneck cycle time cost associated with a process step having the lowest net flow rate by multiplying the lowest net flow rate by a cycle time charge and by the second quantity;

obtaining, from the computer, a total bottleneck cost by summing the product's bottleneck cycle time cost and a product's raw materials cost; and, displaying a total bottleneck cost.

9. A method for obtaining cost information in a manufacturing facility, wherein the manufacturing facility includes a work cell having a bar code scanner coupled to a work cell computer, and wherein the work cell computer is coupled to a central computer, comprising:

inputting time and quantity data by the bar code scanner at the work cell;

storing the time and quantity data from the work cell in a memory location in the work cell computer;

calculating cost information, by the central computer, regarding the work cell in response to the time and quantity data; and outputting the cost information to a printer.

10. The method of claim 9, wherein the work cell completes a manufacturing process step.

11. The method of claim 10, wherein the time and quantity data include a unit acceptance time and a unit acceptance quantity.

12. The method of claim 10, wherein the time and quantity data include a begin run time of the manufacturing process step.

13. The method of claim 10, wherein the time and quantity data include a complete run time of the manufacturing process step.

14. The method of claim 10, wherein the time and quantity data include a complete quantity of the manufacturing process step.

15. The method of claim 10, wherein the cost information includes a scrap quantity of the manufacturing process step.

16. The method of claim 9, wherein the cost information includes gross cycle time.

17. The method of claim 9, wherein the cost information includes net cycle time.

18. The method of claim 9, wherein the outputting of the cost information further includes outputting the cost information to a screen display.

19. An apparatus for improving a manufacturing process, wherein the manufacturing process includes a work cell for completing a process step, the apparatus comprising:

input means for obtaining unit quantity and time data from the work cell;

processing means, coupled to the input means, for calculating cycle time costing data in response to the unit quantity and time data; and, output means, coupled to the processing means, for presenting the cycle time costing data.

20. The apparatus of claim 19, wherein the input means includes a bar code scanner, and the processing means includes a computer coupled to the bar code scanner.

21. The apparatus of claim 19, wherein the unit quantity and time data include unit acceptance quantity and unit acceptance time.

22. The apparatus of claim 19, wherein the unit quantity and time data include begin run time.

23. The apparatus of claim 19, wherein the unit quantity and time data include complete run quantity and complete run time.

24. The apparatus of claim 19, wherein the processing means includes a computer.

25. The apparatus of claim 24, wherein the computer is coupled to a network that is coupled to the input means.

26. The apparatus of claim 19, wherein the output means includes a printer.

27. The apparatus of claim 19, wherein the output means includes a screen display.

28. The apparatus of claim 19, wherein the output means includes a projection display nearby the work cell.

29. An apparatus for obtaining cost information in a manufacturing facility, wherein the manufacturing facility includes a production line for manufacturing a product, and the production line includes a plurality of work cells, the apparatus comprising:

a bar code scanner for obtaining unit information from a work cell in the production line, the unit information including a first time associated with a first quantity of units;

a local computer, coupled to the bar code scanner, for storing the unit information in computer memory;

a central computer, coupled to the local computer, for calculating cycle time costing data, wherein the calculating includes subtracting the first time from a second time associated with a second quantity of units to obtain a gross cycle time; and, output means, coupled to the central computer, for presenting the cycle time costing data.

30. The apparatus of claim 29, wherein the cycle time costing data include bottleneck information.

31. The apparatus of claim 29, wherein the cycle time costing data include gross cycle time and net cycle time for a work cell in the production line.

32. The apparatus of claim 29, wherein the cycle time costing data include gross cycle time and net cycle time for the product manufactured in the production line.

33. The apparatus of claim 29, wherein the cycle time costing data include a scrap rate.

34. The apparatus of claim 29, wherein the output means includes a printer.

35. The apparatus of claim 29, wherein the output means includes a projection display nearby a work cell in the production line.

36. An apparatus for obtaining cycle time costing data for a manufacturing facility having a production line, wherein the production line includes a plurality of work cells, the apparatus comprising:

a first input device at a first work cell in the plurality of work cells in the production line, for inputting time and quantity information including a first time and a first quantity of units, the first time associated with the first quantity of units to be processed at the first work cell;

a first local computer at the first work cell, coupled to the first input device, for storing the first time and the first quantity;

a second input device at a second work cell in the plurality of work cells in the production line, for inputting time and quantity information including a second time and a second quantity of units, the second time associated with the second quantity of units to be processed at the second work cell;

a second local computer at the second work cell, coupled to the second input device, for storing the second time and the second quantity;

a central computer, coupled to the first and second local computers, for calculating the cycle time costing data including a gross cycle time, the gross cycle time obtained by subtracting the first time from the second time, in response to the time and quantity information from the first and second work cells; and an outputting device, coupled to the central computer, for outputting the cycle time costing data of the first work cell.

37. The apparatus of claim 36, wherein the cycle time costing data further includes a gross cycle time rate obtained by dividing, by the central computer, the gross cycle time by the second quantity of units.

* * * * *

UNITED STATES PATENT AND TRADEMARK OFFICE
CERTIFICATE OF CORRECTION

PATENT NO. : 5,966,694
DATED : October 12, 1999
INVENTOR(S) : Rothschild et al.

It is certified that error appears in the above-identified patent and that said Letters Patent is hereby corrected as shown below:

Column 3,
Lines 25-26, please delete "real-setting of standard costs." and insert -- real-time. The method eliminates the requirement for costing studies and the setting of standard costs -- therefore.

Column 13, claim 2,
Line 65, please delete "fit" and insert -- first -- therefor.

Column 14, claim 8,
Lines 61-62, please delete "lowest net flow" and insert -- net cycle time -- therefor.

Signed and Sealed this

Sixth Day of November, 2001

*Attest:*

*Attesting Officer*

NICHOLAS P. GODICI
*Acting Director of the United States Patent and Trademark Office*